T. W. DEE.
ARTIFICIAL TOOTH.
APPLICATION FILED JULY 5, 1918.

1,282,199.

Patented Oct. 22, 1918.

INVENTOR
Thomas W. Dee

BY:
Hardway & Cathey
ATTORNEYS.

UNITED STATES PATENT OFFICE.

THOMAS W. DEE, OF HOUSTON, TEXAS.

ARTIFICIAL TOOTH.

1,282,199.  Specification of Letters Patent.  Patented Oct. 22, 1918.

Application filed July 5, 1918. Serial No. 243,464.

*To all whom it may concern:*

Be it known that I, THOMAS W. DEE, a citizen of the United States, residing at Houston, in the county of Harris and State of Texas, have invented certain new and useful Improvements in Artificial Teeth, of which the following is a specification.

This invention relates to new and useful improvements in an artificial tooth, and has particular relation to a means for anchoring an artificial tooth to the plate.

The object of the invention is to provide a device of the character described whereby the ordinary artificial tooth, which is usually formed of porcelain, may be easily and securely anchored to the plate.

With the above and other objects in view, the invention has particular relation to certain novel features of construction, arrangement of parts, and use, an example of which is given in this specification and illustrated in the accompanying drawings, wherein.

Figure 3:
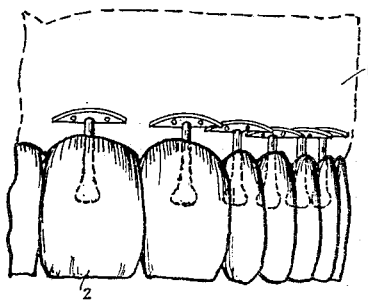
Fig. 3, is an enlarged, fragmentary front view.
Figure 4:
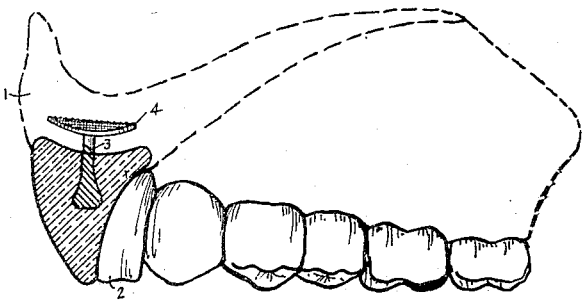
Fig. 4, is an enlarged sectional view, taken on the line 4—4 of Fig. 1.
Figure 2:
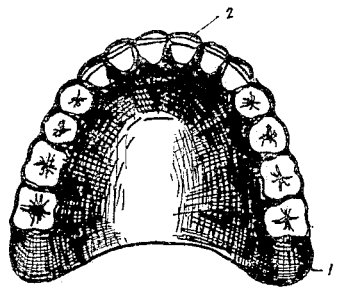
Fig. 2, is a bottom view thereof.
Figure 1:
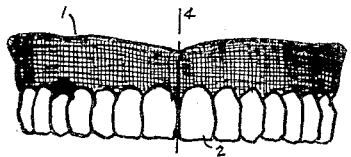
Figure 1, is a front view of a plate, showing artificial teeth anchored thereto.
Figure 5:
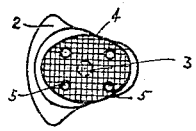
Fig. 5, is a top view of the anchor.

Referring now more particularly to the drawings, wherein like numerals of reference designate similar parts in each of the drawings, the numeral 1 refers to the plate to which the teeth are anchored, said plate being composed of rubber or other suitable material, which is given the required form when in plastic state. The numeral 2 refers to the artificial teeth, which are usually formed of porcelain, or other similar material.

The numeral 3 designates the anchor pin, one end of which is flared and embedded in the material, of which the tooth is formed, and the other end of which projects beyond the tooth, and is formed into a disk-like head 4. The material of which the plate 1 is composed is given the required form when in plastic state, and the heads 4, and the projecting ends of the pins 3, are embedded therein and said material allowed to harden therearound. The head 4 has a plurality of perforations, as 5, through which the material of the plate, when in plastic state, is forced, thus securely anchoring the head in said material and preventing the detachment of the pin 3 therefrom.

The teeth of the plate are placed in proper alinement, and are anchored to the plate, as above described, while the material, of which the plate is formed, is in plastic condition, and said material then permitted to harden, thus securely anchoring the teeth to the plate.

By means of the form of anchorage herein described, the ordinary porcelain tooth, now in common use, may be readily and securely anchored to the ordinary form of plate, also in common use.

What I claim is:

An anchor for securing artificial teeth to plates, said anchor consisting of a pin, one end of which is flared, and the other end of which is formed into a large disk-like head, said head being perforated.

In testimony whereof I have signed my name to this specification in the presence of two subscribing witnesses.

THOMAS W. DEE.

Witnesses:
 E. V. HARDWAY.
 EVERT PARSONS.

Copies of this patent may be obtained for five cents each, by addressing the "Commissioner of Patents, Washington, D. C."